(12) United States Patent
Masin

(10) Patent No.: US 7,855,649 B2
(45) Date of Patent: Dec. 21, 2010

(54) TAMPER RESISTANT RFID TAGS AND ASSOCIATED METHODS

(76) Inventor: Joseph V. Masin, 1313 Danielson Rd., Santa Barbara, CA (US) 93108

( * ) Notice: Subject to any disclaimer, the term of this patent is extended or adjusted under 35 U.S.C. 154(b) by 290 days.

(21) Appl. No.: 12/288,638

(22) Filed: Oct. 22, 2008

(65) Prior Publication Data

US 2009/0128340 A1 May 21, 2009

Related U.S. Application Data

(60) Provisional application No. 61/003,990, filed on Nov. 21, 2007.

(51) Int. Cl.
*G08B 13/14* (2006.01)
*H01S 4/00* (2006.01)
*H01Q 13/00* (2006.01)

(52) U.S. Cl. .............. 340/572.8; 340/572.1; 340/572.9; 29/600; 29/592.1

(58) Field of Classification Search ................. None
See application file for complete search history.

(56) References Cited

U.S. PATENT DOCUMENTS

| | | | |
|---|---|---|---|
| 4,746,556 A | 5/1988 | Matsuguchi et al. ........... 428/40 |
| 5,867,102 A | 2/1999 | Souder et al. ............... 340/572 |
| 6,043,746 A * | 3/2000 | Sorrells .................... 340/572.7 |
| 6,121,880 A | 9/2000 | Scott et al. ................ 340/572.5 |
| 6,262,692 B1 | 7/2001 | Babb .......................... 343/895 |
| 6,421,013 B1 | 7/2002 | Chung ........................ 343/700 |
| 6,888,509 B2 | 5/2005 | Atherton ..................... 343/718 |
| 7,049,962 B2 | 5/2006 | Atherton et al. ........... 340/572.1 |
| 7,095,324 B2 | 8/2006 | Conwell et al. ........... 340/572.1 |
| 2006/0202824 A1 | 9/2006 | Carroll et al. ............. 340/568.1 |
| 2007/0029384 A1 | 2/2007 | Atherton ..................... 235/435 |
| 2007/0247317 A1 * | 10/2007 | Farrell ..................... 340/572.8 |
| 2008/0016005 A1 * | 1/2008 | Owen et al. .................... 705/73 |
| 2009/0045963 A1 | 2/2009 | Vigneron et al. .......... 340/572.8 |
| 2009/0121877 A1 * | 5/2009 | Henderson ............... 340/572.7 |

* cited by examiner

*Primary Examiner*—Julie Lieu
(74) *Attorney, Agent, or Firm*—O'Keefe, Egan, Peterman & Enders, LLP

(57) ABSTRACT

Systems and methods are disclosed for a tamper resistant RFID (radio frequency identification) tags that overcome the problems existing with previous RFID tags. The tamper resistant RFID tags described herein are particularly useful for tracking of liquid propane gas (LPG) containers and/or other types of containers or objects. Removal of the RFID tag, after it is attached, will destroy and/or render inoperable the RFID transponder within the tag so that removal and re-use is not practical or possible. One key feature of this tamper resistant RFID tag is the use of adhesive materials with differing adhesion characteristics with respect to the container material (e.g., metal) and the housing for the RFID tag (e.g., plastic) so that the RFID tag will tend to be destroyed when removal is attempted.

23 Claims, 4 Drawing Sheets

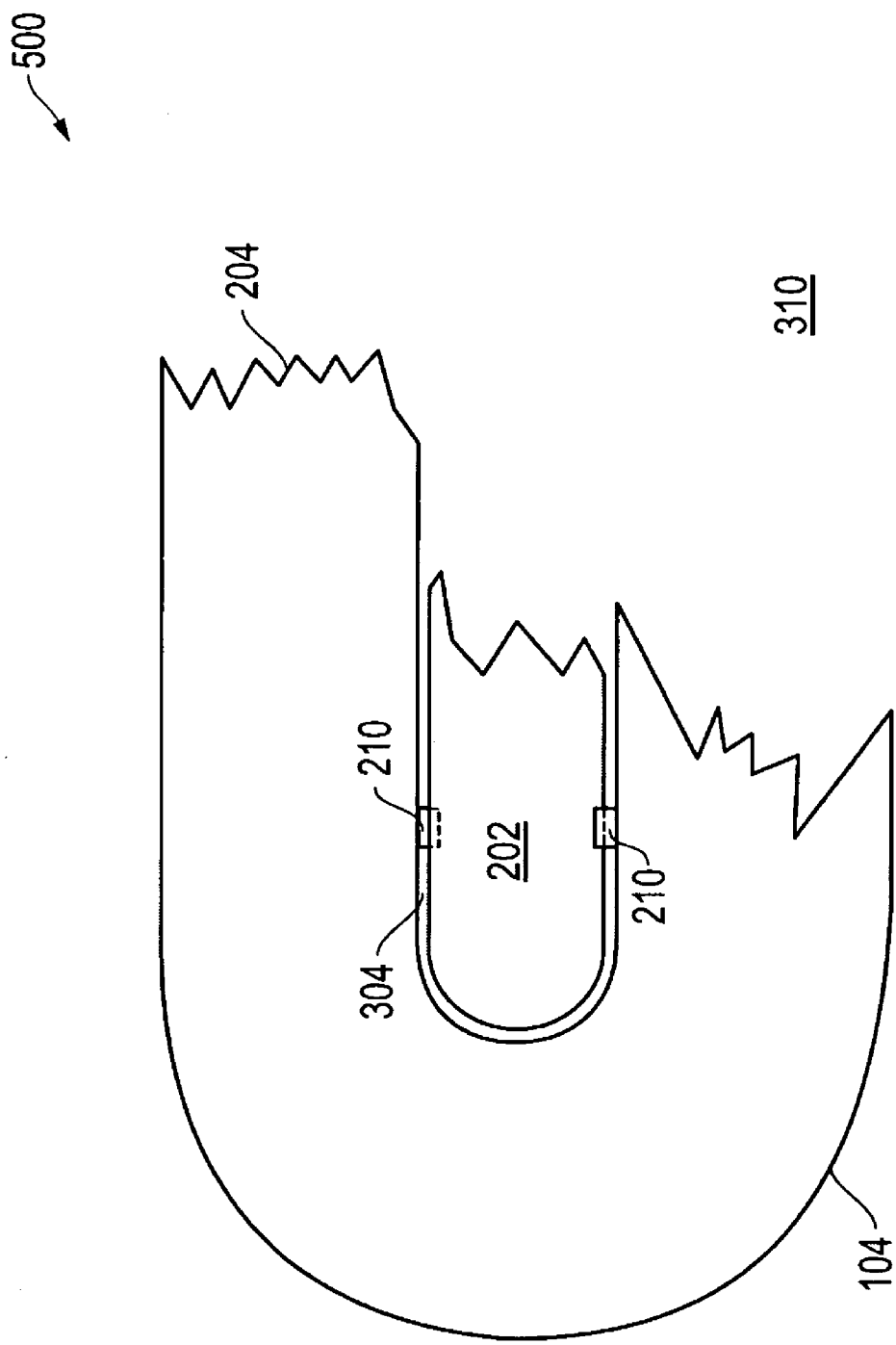

TAMPER RESISTANT RFID TAGS AND ASSOCIATED METHODS

RELATED APPLICATIONS

This application claims priority to the following co-pending provisional application: Provisional Application Ser. No. 61/003,990 entitled "TAMPER RESISTANT RFID TAGS AND ASSOCIATED METHODS," which was filed on Nov. 21, 2007.

TECHNICAL FIELD OF THE INVENTION

The present invention relates generally to miniature electronic devices and more particularly to miniature transponder devices suitable for assets management and other purposes.

BACKGROUND

Prior RFID (radio frequency identification) tags exist that are used to help track various products. RFID tags are typically an assembly including an RFID transponder coupled into a protective housing, and the assembly can then be used for assets management, container safety inspection purposes, fraud prevention, ownership identification or other purposes. One application for such RFID tags, for example, is the use of RFID tags to help track hazardous products, such as liquid propane gas (LPG) stored in metal containers or cylinders. However, one problem with existing RFID tags is that they can be removed from the container. Once removed, they can be applied to a different product or re-used. This removal and re-use causes a security risk that is undesirable.

SUMMARY OF THE INVENTION

Systems and methods are disclosed for a tamper resistant RFID (radio frequency identification) tags that overcome the problems existing with previous RFID tags. The tamper resistant RFID tags described herein are particularly useful for tracking of liquid propane gas (LPG) containers and/or other types of containers or objects. Removal of the RFID tag, after it is attached, will destroy and/or render inoperable the RFID transponder within the tag so that removal and re-use is not practical or possible. One key feature of this tamper resistant RFID tag is the use of adhesive materials with differing adhesion characteristics with respect to the container material (e.g., metal) and the housing for the RFID tag (e.g., plastic) so that the RFID tag will tend to be destroyed when removal is attempted. Further, other features and variations can be implemented, if desired, and related systems and methods can be utilized as well.

In one embodiment, an assembly for a tamper resistant RFID tag is disclosed. The assembly includes an object having a surface; a housing having a bottom surface with the housing further including a cavity within the bottom surface and one or more structures protruding from an inner wall of the cavity; an RFID transponder positioned within the cavity; a potting element within the cavity where the potting element engages the RFID transponder and the one or more structures and where the potting element is a material that is weaker than the housing; and an adhesive positioned between the bottom surface of the housing and the surface of the object to adhere the housing and the potting element to the surface of the object where the adhesive is a material that bonds more strongly to the surface of the object than to the housing, bonds more strongly to the surface of the object than to the potting element, and bonds more strongly to the potting element than the housing so that the potting element will tend to break rendering the RFID transponder inoperable if the housing is pried off the object. In addition, other features and variations can be implemented, if desired, and related systems and methods can be utilized as well.

In another embodiment, a method for forming an assembly having a tamper resistant RFID tag is disclosed. The method includes providing an object having a surface; providing a housing having a bottom surface with the housing further comprising a cavity within the bottom surface and one or more structures protruding from an inner wall of the cavity; positioning an RFID transponder within the cavity; injecting a potting element within the cavity to engage the RFID transponder and the one or more structures where the potting element comprising a material that is weaker than the housing when hardened, allowing the potting element to harden; selecting an adhesive comprising a material that bonds more strongly to the surface of the object than to the housing, bonds more strongly to the surface of the object than to the potting element, and bonds more strongly to the potting element than the housing; and applying the adhesive between the bottom surface of the housing and the surface of the object to adhere the housing and the potting element to the surface of the object so that the potting element will tend to break rendering the RFID transponder inoperable if the housing is pried off the object. In addition, other features and variations can be implemented, if desired, and related systems and methods can be utilized as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 5 is a bottom view of the RFID tag installed on a metal cylinder.

DETAILED DESCRIPTION OF THE INVENTION

Systems and methods are disclosed for a tamper resistant RFID (radio frequency identification) tag that overcome problems existing with previous RFID tags. The tamper resistant RFID tags described herein help to prevent removal, re-use and/or possible switching of RFID tags on containers, such as metal cylinders used for carrying non-hazardous material or hazardous material, such as liquid propane gas (LPG). The tamper resistant RFID tags can also be used on other objects, as desired.

Figure 1:
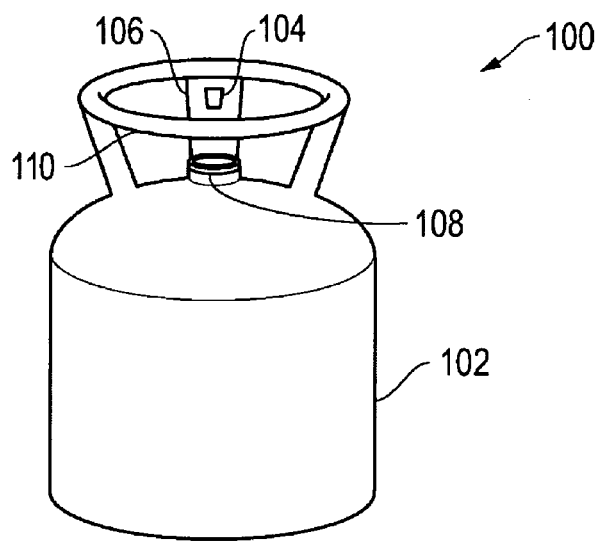
FIG. 1 is a diagram for a material container, such as a metal cylinder holding liquid propane gas (LPG), having an RFID tag.

FIG. 1 is a diagram for an embodiment 100 including a container 102, such as a metal cylinder holding LPG or other hazardous or non-hazardous material, having an RFID tag 104. The cap 108 for the cylinder 102 is located at the top of the cylinder 102. The RFID tag 104 may be positioned on a metal surface of the LPG cylinder 102. As depicted for this embodiment, the RFID tag 104 is positioned on an inside surface of a metal stay plate 106 connecting the gas containing portion of the cylinder 102 to a ring 110 that can be used for picking up or moving the cylinder 102. Other locations for the RFID tag 104 could also be used, as desired. It is further noted that the container 102 could be any desired object to which it is desired to attach the tamper resistant RFID tag 104. It is also noted that the surface on the object to which the tamper resistant RFID tag 104 is attached can be any desired material, including a metal surface.

Figure 2:
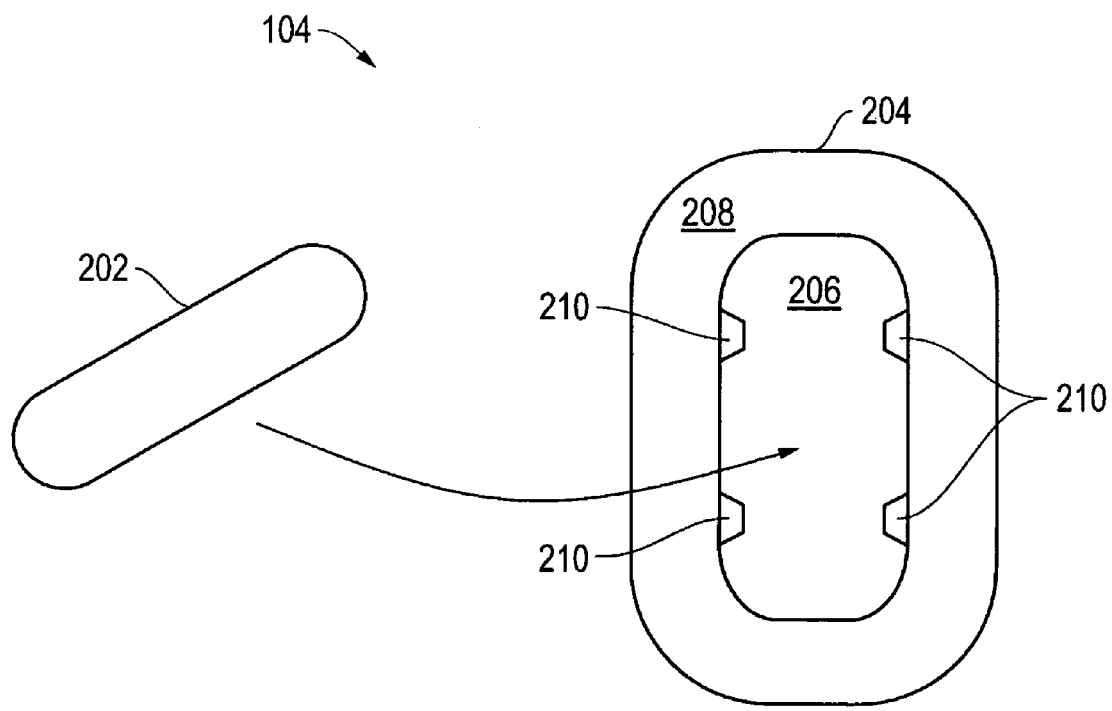
FIG. 2 is a diagram for an RFID assembly including a transponder and a housing for the transponder.

FIG. 2 is a diagram for an RFID tag 104 including an assembly of an RFID transponder 202 and a housing 204 for the transponder. The bottom surface 208 of the housing 204 is coupled to the metal cylinder 102. The housing 204 includes a space 206 in which the transponder 202 can be seated. If desired, wedges 210 can be formed on the walls of the space 206 help to keep the transponder 202 in place and to help damage the transponder 202 upon an attempted removal, as further described below. A potting element, as described further below, can be added to the space 206 after the transponder 202 is inserted to secure the transponder 202 in place. As also described further below, an adhesive is used to secure the RFID tag 104 to the container 102.

Figure 3:
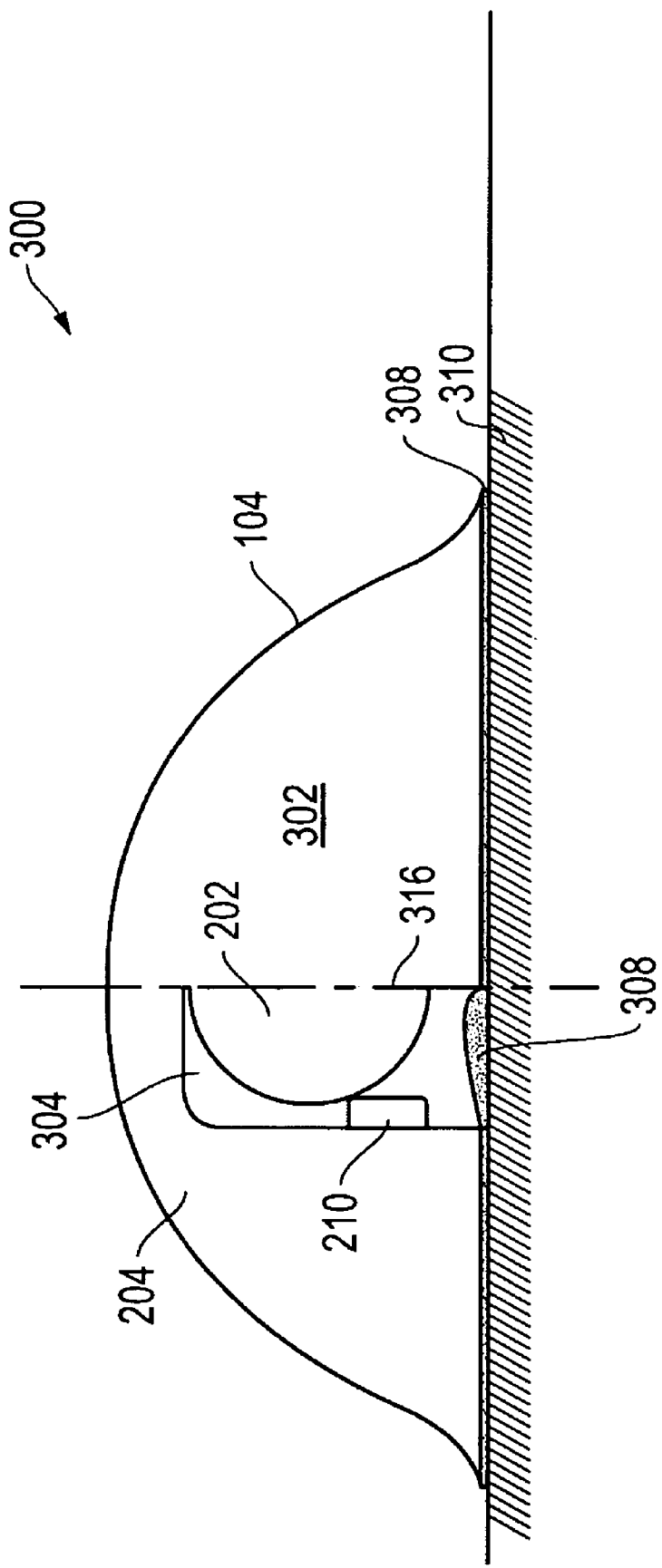
FIG. 3 is a top view of the RFID tag installed on a metal cylinder.

FIG. 3 is a top view 300 of the RFID tag 104 installed on a metal cylinder 310. As depicted, the left side of the plastic housing 204 is cut away along line 316 to reveal the potting element 304, a wedge 210, and the transponder 202. The side surface of the metal cylinder 310 is shown at the bottom. Adhesive 308 couples the potting element 304 to the metal cylinder 310. Adhesive 308 also couples the plastic housing 302 to the metal cylinder 310. The transponder 202 is coupled into the housing 204 using the potting element 304. The wedge 210 is adjacent and preferably touching the transponder 202. In this way, the RFID tag 104, including the transponder 202, is coupled to the metal cylinder 310.

Figure 4:
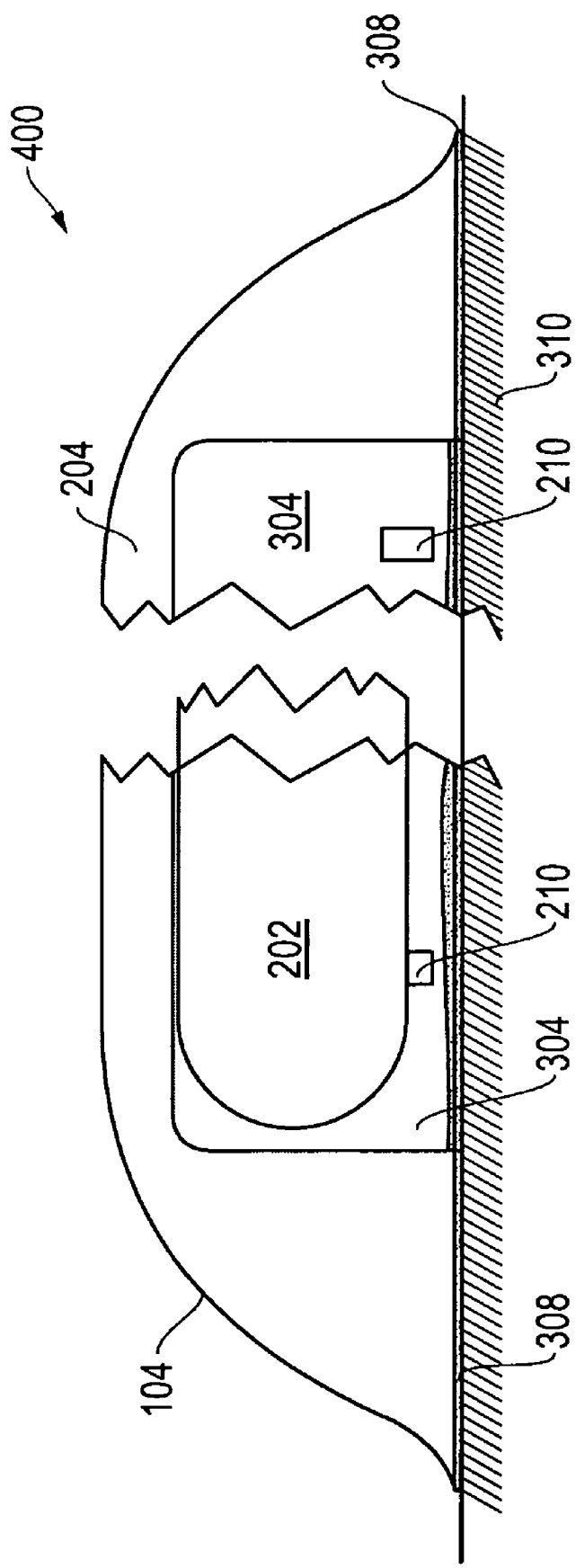
FIG. 4 is a side view of the RFID tag installed on a metal cylinder.

FIG. 4 is a side view 400 of the RFID tag 104 installed on a metal cylinder 310. In this view, the left side of the drawing includes the transponder 202, and the right side is shown without the transponder 202. Again, the adhesive 308 couples the potting element 304 and the plastic housing 204 to the metal cylinder 310. The transponder 202 is again coupled to the plastic housing 204 using potting element 304. Wedges 210 again are adjacent and preferably touching the transponder 202.

FIG. 5. is a bottom view 500 of the RFID tag 104 installed on a metal cylinder 310. In this view, the metal surface 310 has been mostly removed and a cut away so that the transponder 202 is shown. The transponder 202 is coupled to the housing 204 using the potting element 304. Wedges 210 are also shown adjacent and preferably touching the transponder 202. The plastic housing 204 surrounds the potting element 304 and the transponder 202. The plastic housing 204 and the potting element 304 are again both coupled to the metal cylinder surface 310 using adhesive 308.

It is noted that the metal surface 310 may be made from a common metal used for containers, such as stainless steel. It is also noted that the metal surface 310 can be located on any desired object for which it is desired to attach the tamper resistant RFID tag 104.

It is also noted that the plastic housing 204 may be made from ABS plastic. ABS (Acrylonitrile Butadiene Styrene) plastic is a terpolymer of acrylonitrile, butadiene and styrene. Usual compositions are about half styrene with the balance divided between butadiene and acrylonitrile. Considerable variation is, of course, possible resulting in many different grades of ABS with a wide range of features and applications. In addition, many blends with other materials such as polyvinylchloride, polycarbonates and polysulfones have been developed. Acrylonitrile butadiene styrene materials can be processed by any of the standard thermoplastic processing methods.

As discussed above, it is desirable to have the RFID tag 104 be destroyed and/or rendered inoperative when it is removed, and/or an attempt is made to remove it, from the container 102 to which it is attached. One such application in which this result is desired is where the RFID tags 104 are used to track hazardous materials, such as LPG stored in metal cylinders 102.

One key feature to the RFID tag solutions described herein is that materials utilized have differing connection strengths with respect to metal as opposed to plastic or ceramics. This difference in connection strength makes it extremely difficult if not impossible for the RFID tag to be removed without destroying it and/or rendering inoperative the RFID transponder.

Example Tamper Proof Materials and Construction

As described above, the RFID transponder 202, either in glass encapsulated form or in non-encapsulated form, is enclosed within a plastic housing 204. An ABS plastic material can be used for the plastic housing 204. The space 206 in the housing 204 into which the transponder 202 is inserted is closed with a liquid potting material 304. The liquid potting material 304 is selected to have a consistency and strength, after hardening, that is less than the overall strength of the ABS plastic housing 204. For example, where ABS plastic is used for the housing 204, a two-part unfilled electronic grade epoxy encapsulant, such as EP 1121 (black) available from Ellsworth Adhesives, can be used for the potting element 304. The completed assembly for the RFID tag 104 is then attached to the metal surface 310 of the container by adhesive 308. The adhesive 308 is selected so as to have desirable adhesive properties. Once constructed and attached, the RFID tag and the properties of materials used herein work together in sequence to achieve an attached RFID tag that is difficult or impossible to remove without destroying the RFID tag and/or rendering it inoperable.

Transponder—The transponder 202 can have an antenna made of copper wire (e.g., 5-15 microns thickness) that is wound around a ferrite core and connected to an RFID integrated circuit. This connection can be made directly to the gold bumps on an RFID integrated circuit, through a compression bonding process, or via a substrate which may include additional components such as storage and/or tuning capacitors. The transponder 202 can be encapsulated in glass for additional protection against outside elements over a long time periods. Alternatively, the transponder 202 can be used without protective glass encapsulation.

Housing—The housing 204 can be made of non-magnetic materials permitting operation of low frequency (e.g., 100-400 kHz) RFID devices, such as plastics, ceramics and glass. Plastic materials, such as plastic and ABS plastic, permit some flexibility. Ceramics and glass materials may also be utilized, but are more brittle. A cavity or space 206 is formed within the housing 204, and this space 206 is configured to receive the transponder 202. If desired, the housing 204 can also have two or more wedges 210 protruding from the walls into the transponder cavity or space 206, if desired. These wedges can help position the transponder 202 and can help destroy it and/or help render it inoperable when the RFID tag 104 is removed. Instead of or in addition to the wedges 210, other structures could also be formed and used that protrude into the potting element 304 to help position the transponder 202 and/or render it inoperable when the RFID tag 104 is attempted to be removed. In addition, to make the housing 204 more difficult to pry off, the housing 204 for the RFID tag 104 can be shaped with rounded edges and a low profile (e.g., only about 4-4.5 mm high).

Potting element—The potting element 304 can be an epoxy, plastic, or other material, capable of being introduced into the housing transponder cavity or space 206 to hold or secure the transponder 202. For example, the potting element 304 can be a material that can be injected in liquid form and that will then harden or cure over time. As described further below, the potting element 304 is preferably a material being weaker than the housing 204 so that the wedges 210 can break the potting element 304 when the housing 204 begins to separate from the potting element 304 when the RFID tag 104 is being pried off the surface of a metal cylinder 310. As indicated above, a two-part unfilled electronic grade epoxy encapsulant, such as EP 1121 (black) available from Ellsworth Adhesives, can be used for the potting element 304.

Adhesive—Adhesive 308 can be an adhesive that bonds more strongly to metal than it does to the material used for the housing 204 or for the potting element 304. When using plastic for the housing 204, such as ABS plastic, adhesives such as 3M products Scotch-Weld DP810, DP125 and/or DP420 or similar adhesives can be utilized for the adhesive 308.

Plastic Housing Solution

For a plastic solution for the housing 204, one key to the success of the tamper proof RFID tag described herein is the use of an adhesive 308 to attach the RFID tag 104 to metal cylinder 310 that will adhere more (and preferably significantly more) to the metal than to the ABS plastic and that will adhere to the potting element 304 more (and preferably significantly more) than to the ABS plastic. One example of such an adhesive is DP420 from 3M Company which has a sheer strength of about 1900 PSI (pounds per square inch) with metal but a peel strength of about 900 PSI to ABS plastic. In addition, this adhesive will adhere to the potting element 304 more than to the ABS plastic. It is further noted that it is desirable that the strength for adhesion of the adhesive 308 to the metal container surface 310 and to the potting element 304 be about 100 PSI or more than the strength of adhesion to the plastic housing 204.

When someone attempts to pry the RFID tag 204 off of the metal container surface 310, the low profile (e.g., only about 4-4.5 mm high) and rounded surfaces of the housing do not allow for application of side forces. The tag will either be crushed and/or, if lifted, partially bent, thereby destroying the electronic transponder assembly, including its glass encapsulation. Should the RFID tag 204 be completely pulled off the metal cylinder surface 310, the potting element 304 will stick to the adhesive better than to the plastic housing 302, and the potting element 304 would be pulled out of the housing cavity 206 together with the remnants of the electronic assembly. Within the transponder 202, the ultra thin antenna wires would be severed from the integrated circuit, and if a substrate were used, the substrate would be detached.

The wedges 210 on the sides of the cavity 206 can be used to assist in the breakage of the hardened potting element 304 and of the transponder 202 when being pulled out. In other words, because the wedges 210 are embedded a distance into the potting element 304, the wedges 210 will tend to pull on the potting element 304 as the RFID tag 104 is being pried off the metal cylinder 310. Because the adhesive 308 is adhered more strongly to the potting element 304 and the metal cylinder 310, the housing 204 will tend to separate from the potting element 304 as the RFID tag 104 is being pried off. As the pressure of this separation grows, the potting element 304 will tend to be broken by the force of the wedges 210 being pulled out with the housing 204.

Ceramic Housing Solution

For a ceramic solution for the housing 204, one key to the success of the tamper proof RFID tag described herein is again the very high degree of the adhesion of the glue or adhesive to the metal and also to the ceramics or glass. In this case, any attempt to remove will result in shattering of the housing 204 and resulting irreversible damage to the electronic assembly (e.g., destruction of ultra thin connection wires).

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An assembly having a tamper resistant RFID tag, comprising:
    an object having a surface;
    a housing having a bottom surface, the housing further comprising a cavity within the bottom surface and one or more structures protruding from an inner wall of the cavity;
    an RFID transponder positioned within the cavity;
    a potting element within the cavity, the potting element engaging the RFID transponder and the one or more structures, the potting element comprising a material that is weaker than the housing; and
    an adhesive positioned between the bottom surface of the housing and the surface of the object to adhere the housing and the potting element to the surface of the object, the adhesive comprising a material that bonds more strongly to the surface of the object than to the housing, bonds more strongly to the surface of the object than to the potting element, and bonds more strongly to the potting element than the housing so that the potting element will tend to break rendering the RFID transponder inoperable if the housing is pried off the object.

2. The assembly of claim 1, wherein the surface of the object comprises a metal material and the housing comprises a plastic material.

3. The assembly of claim 2, wherein the object comprises a metal container.

4. The assembly of claim 3, wherein the metal container holds liquid propane gas.

5. The assembly of claim 4, wherein a strength of adhesion for the adhesive to the surface of the metal container and to the potting element is 100 pounds per square inch or more greater than a strength of adhesion for the adhesive to the to the plastic housing.

6. The assembly of claim 1, wherein the housing has rounded edges and a profile of less than 4.5 mm.

7. The assembly of claim 1, wherein the surface of the object comprises a metal material, the housing comprises an acrylonitrile butadiene styrene (ABS) plastic material, and the potting element comprises an electronic grade epoxy encapsulant.

8. The assembly of claim 1, wherein the potting element comprises a material that is injectable in liquid form and then hardens over time.

9. The assembly of claim 1, wherein the one or more structures comprise a plurality of wedge structures.

10. The assembly of claim 9, wherein the wedge structures touch the RFID transponder.

11. The assembly of claim 1, wherein the RFID transponder comprises an encapsulated RFID transponder.

12. The assembly of claim 1, wherein the RFID transponder comprises a non-encapsulated RFID transponder.

13. The assembly of claim 1, wherein the housing comprises a ceramic material.

14. A method for forming an assembly having a tamper resistant RFID tag, comprising:
   providing an object having a surface;
   providing a housing having a bottom surface, the housing further comprising a cavity within the bottom surface and one or more structures protruding from an inner wall of the cavity;
   positioning an RFID transponder within the cavity;
   injecting a potting element within the cavity to engage the RFID transponder and the one or more structures, the potting element comprising a material that is weaker than the housing when hardened;
   allowing the potting element to harden;
   selecting an adhesive comprising a material that bonds more strongly to the surface of the object than to the housing, bonds more strongly to the surface of the object than to the potting element, and bonds more strongly to the potting element than the housing; and
   applying the adhesive between the bottom surface of the housing and the surface of the object to adhere the housing and the potting element to the surface of the object so that the potting element will tend to break rendering the RFID transponder inoperable if the housing is pried off the object.

15. The method of claim 14, wherein the surface of the object comprises a metal material and the housing comprises a plastic material.

16. The method of claim 15, wherein the object comprises a metal container holding liquid propane gas.

17. The method of claim 16, wherein the selecting step comprises selecting an adhesive having a strength of adhesion to the surface of the metal container and to the potting element that is 100 pounds per square inch or more greater than a strength of adhesion for the adhesive to the to the plastic housing.

18. The method of claim 14, wherein the housing has rounded edges and a profile of less than 4.5 mm.

19. The method of claim 14, wherein the surface of the object comprises a metal material, the housing comprises an acrylonitrile butadiene styrene (ABS) plastic material, and the potting element comprises an electronic grade epoxy encapsulant.

20. The method of claim 14, wherein the one or more structures comprise a plurality of wedge structures.

21. The method of claim 20, further comprising positioning the RFID transponder so that the RFID transponder touches the plurality of wedge structures.

22. The method of claim 14, further comprising providing an encapsulated RFID transponder for the positioning step.

23. The method of claim 14, further comprising providing a non-encapsulated RFID transponder for the positioning step.

* * * * *